United States Patent
Jang et al.

(10) Patent No.: US 11,939,494 B2
(45) Date of Patent: Mar. 26, 2024

(54) RESIN COMPOSITION FOR BONDING SEMICONDUCTOR AND ADHESIVE FILM FOR SEMICONDUCTOR USING THE SAME

(71) Applicant: LG CHEM, LTD., Seoul (KR)

(72) Inventors: Jong Min Jang, Daejeon (KR); Byoung Ju Choi, Daejeon (KR); Kwang Joo Lee, Daejeon (KR); Yu Lin Sun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 17/404,053

(22) Filed: Aug. 17, 2021

(65) Prior Publication Data

US 2022/0098455 A1 Mar. 31, 2022

(30) Foreign Application Priority Data

Aug. 19, 2020 (KR) ........................ 10-2020-0104211

(51) Int. Cl.
*C09J 163/00* (2006.01)
*C09J 133/08* (2006.01)

(52) U.S. Cl.
CPC ........... *C09J 163/00* (2013.01); *C09J 133/08* (2013.01)

(58) Field of Classification Search
CPC .............................. C09J 133/08; C09J 163/00
USPC ........................................................ 523/220
See application file for complete search history.

(56) References Cited

U.S. PATENT DOCUMENTS

| | | | | |
|---|---|---|---|---|
| 2007/0241434 A1* | 10/2007 | Inada | ...................... | C09J 163/00 438/118 |
| 2009/0277678 A1* | 11/2009 | Kuwabara | .............. | H05K 3/305 174/260 |
| 2012/0267803 A1* | 10/2012 | Lee | .................... | C08G 59/4014 438/464 |
| 2015/0299550 A1 | 10/2015 | Kusunoki et al. | | |
| 2016/0104657 A1 | 4/2016 | Aramaki et al. | | |
| 2017/0154841 A1* | 6/2017 | Nakamura | .......... | H01L 21/4857 |
| 2020/0362209 A1 | 11/2020 | Jang et al. | | |

FOREIGN PATENT DOCUMENTS

| | | | | |
|---|---|---|---|---|
| CN | 103987790 A | | 8/2014 | |
| CN | 107871721 A | | 4/2018 | |
| JP | 2005290076 A | * | 10/2005 | ............. C08G 59/62 |
| JP | 2006063136 A | * | 3/2006 | ............. C08L 63/00 |
| JP | 2007194268 A | | 8/2007 | |
| JP | 2011-202177 A | | 10/2011 | |
| JP | 2016044208 A | * | 4/2016 | ............. C08G 59/40 |
| JP | 2019056041 A | * | 4/2019 | ............. C08L 63/00 |
| KR | 10-2008-0113670 A | | 12/2008 | |
| KR | 10-2009-0032680 A | | 4/2009 | |
| KR | 10-2015-0087090 A | | 7/2015 | |
| KR | 10-2016-0013270 A | | 2/2016 | |
| KR | 10-2016-0119561 A | | 10/2016 | |
| KR | 10-2017-0101603 A | | 9/2017 | |
| KR | 10-2019-0025723 A | | 3/2019 | |
| KR | 10-2019-0094090 A | | 8/2019 | |
| KR | 10-2019-0098062 A | | 8/2019 | |
| KR | 10-2019-0098614 A | | 8/2019 | |

OTHER PUBLICATIONS

Oka, JP 2006-063136 A machine translation in English, Mar. 9, 2006. (Year: 2006).*
Maeda, JP 2005-290076 A machine translation in English, Oct. 20, 2005. (Year: 2005).*
Mitamura et al., JP 2019-056041 A machine translation in English, Apr. 11, 2019. (Year: 2019).*
Fujiyasu et al., JP 2016-044208 A machine translation in English, Apr. 4, 2016. (Year: 2016).*

* cited by examiner

*Primary Examiner* — David T Karst
(74) *Attorney, Agent, or Firm* — ROTHWELL, FIGG, ERNST & MANBECK, P.C.

(57) ABSTRACT

A technical problem to be achieved by the present disclosure is to provide an adhesive resin composition for a conductor, which contains inorganic fillers having different average particle diameters and has enhanced thermal conductivity as a result of controlling the content of the inorganic fillers, and an adhesive film for a semiconductor produced using the same.

12 Claims, No Drawings

RESIN COMPOSITION FOR BONDING SEMICONDUCTOR AND ADHESIVE FILM FOR SEMICONDUCTOR USING THE SAME

1. TECHNICAL FIELD

This application claims the benefit of the filing date of Korean Patent Application No. 10-2020-0104211 filed with the Korean Intellectual Property Office on Aug. 19, 2020, the entire content of which is incorporated herein by reference.

The present disclosure relates to an adhesive resin composition for a semiconductor and an adhesive film for a semiconductor including the same, and more particularly, to an adhesive resin composition for a semiconductor, which contains inorganic fillers having different average particle diameters and has enhanced thermal conductivity as a result of controlling the content of the inorganic fillers, and an adhesive film for a semiconductor produced using the same.

2. BACKGROUND OF THE INVENTION

In recent years, as the tendency toward miniaturization, high functionalization, and capacity enlargement of electronic devices has been expanding and thus a demand for densification and high integration of semiconductor packages has rapidly increased, the sizes of semiconductor chips have become larger and larger. For improvement in terms of the integration density of semiconductor devices, the use of a stack packaging method for stacking chips in multiple layers has gradually increased.

Depending on the use of the multilayered semiconductor stack package as described above, the thickness of a chip becomes thinner and the degree of integration of circuits becomes higher. However, the modulus of the chip itself is lowered, causing problems in terms of the fabrication process and the reliability of the final product. In order to overcome these problems, attempts have been made to enhance the physical properties of an adhesive for use in the semiconductor packaging process.

In addition, as a semiconductor chip has recently become thinner, a problem arises in that the chip is damaged in an existing blade cutting process, resulting in a decrease in yield. In order to overcome this problem, a fabrication process of cutting a semiconductor chip with a blade and then polishing the chip has been proposed. Since an adhesive is not divided into parts in this fabrication process, the adhesive is cut using a laser, and then divided into parts through a process of expanding a substrate film at low temperature. In addition, in recent years, in order to protect the circuit on a chip, a process of dividing an adhesive into parts only through a low-temperature expanding process and a heat shrinking process without using a laser has been applied.

Meanwhile, in recent years, as electronic devices and electronic components become lighter in weight and smaller in size, the integration density of electrical devices has increased, and the amount of heat generated by electric elements operating with electric energy has also greatly increased. Accordingly, there is a growing demand for improvement in heat dissipation characteristics for effectively dispersing and dissipating heat generated inside electronic devices.

However, a previously developed heat-dissipation adhesive material has limitations in that it is highly reactive, and thus reacts by itself or spontaneously reacts with a dicing tape when stored at room temperature, so that the viscosity of the heat-dissipation adhesive material increases and the adhesive force thereof with the dicing tape increases.

If the adhesive force between the heat-dissipation adhesive material and the dicing tape increases, pickup in a process of picking up a chip after semiconductor wafer mounting and UV irradiation may not be successfully achieved, and thus a subsequent semiconductor process may not be performed.

If the viscosity of the heat-dissipation adhesive material increases, a problem also arises in that an important filling characteristic in the case of a heat dissipation fill-over-die (FOD) remarkably deteriorates while the wettability of a semiconductor wafer with the heat-dissipation adhesive material decreases.

Accordingly, there is a demand to develop an adhesive resin composition for a semiconductor which may exhibit excellent storage stability at room temperature by ensuring optimal levels of viscosity and adhesiveness and may exhibit excellent thermal conductivity characteristics.

BRIEF SUMMARY OF THE INVENTION

A technical problem to be achieved by the present disclosure is to provide an adhesive resin composition for a semiconductor, which contains inorganic fillers having different average particle diameters and has enhanced thermal conductivity as a result of controlling the content of the inorganic fillers, and an adhesive film for a semiconductor produced using the same.

However, the technical problem to be achieved by the present disclosure is not limited to the above-mentioned problem, and other problems not mentioned herein will be clearly understood by those skilled in the art from the following description.

One embodiment of the present disclosure provides an adhesive resin composition for a semiconductor containing: a binder resin including one selected from the group consisting of a (meth)acrylate-based resin, an epoxy resin, and a combination thereof; a curing agent; and at least two inorganic fillers having different average particle diameters.

Another embodiment of the present disclosure provides an adhesive film for a semiconductor including a cured product obtained by curing the adhesive resin composition for a semiconductor.

DETAILED DESCRIPTION OF THE INVENTION

Throughout the present specification, it is to be understood that when any part is referred to as "including" any component, it does not exclude other components, but may further include other components, unless otherwise specified.

In the present specification, the average particle diameter of an inorganic filler is measured by placing an adhesive film in a crucible, incinerating the adhesive film with intense heat 700° C. for 2 hours in an atmospheric atmosphere, dispersing the resulting ash in pure water, sonicating the dispersion for 10 minutes, and then measuring the average particle diameter of the ash by a laser diffraction scattering type particle size distribution analyzer (Beckman Coulter LS 13 320; wet method). Meanwhile, components other than fillers in the composition of the adhesive film are organic compounds, all of the organic compounds are substantially incinerated by treatment with the intense heat, and thus the resulting ash is regarded as the filler and the measurement of the average particle diameter thereof is performed.

In the present specification, the specific surface area of the inorganic filler is measured by a BET adsorption method (multipoint method). Specifically, using the Quantachrome 4-station specific surface area/pore distribution analyzer "NOVA-4200e" (Quantachrome Corp.), the ash obtained in accordance with the section "Measurement of particle size distribution and average particle diameter of filler" is vacuum-degassed at 110° C. for 6 hours or more, and then the specific surface area thereof is measured at a temperature 77.35 K under nitrogen gas.

In the present specification, the term "weight-average molecular weight" means the weight-average molecular weight in terms of polystyrene measured by the GPC method. In the process of measuring the weight-average molecular weight in terms of polystyrene by the GPC method, a commonly known analyzer, a detector such as a differential refractive index detector, and an analysis column, may be used, and commonly applied temperature conditions, solvents, and flow rates may be applied. Specific examples of the measurement conditions are as follows: the use of a Waters PL-GPC220 instrument with a Polymer Laboratories PLgel MIX-B column (length: 300 mm), an evaluation temperature of 160° C., the use of 1,2,4-trichlorobenzene as a solvent, a flow rate of 1 mL/min. A sample is prepared at a concentration of 10 mg/10 mL, and then supplied in an amount of 200 μL. The Mw value may be calculated using a calibration curve formed using polystyrene standards. As the molecular weights of the polystyrene standards, the following nine molecular weights are used: 2,000, 10,000, 30,000, 70,000, 200,000, 700,000, 2,000,000, 4,000,000, and 10,000,000.

Hereinafter, the present disclosure will be described in more detail.

One embodiment of the present disclosure provides an adhesive resin composition for a semiconductor containing: a binder resin including one selected from the group consisting of a (meth)acrylate-based resin, an epoxy resin, and a combination thereof; a curing agent; and at least two inorganic fillers having different average particle diameters.

In the adhesive resin composition for a semiconductor according to one embodiment of the present disclosure, separation of the inorganic fillers does not occur due to increased stability of the composition itself. In addition, as the adhesive resin composition may contain a large amount of the inorganic fillers, the density of a cured product of the adhesive resin composition may be controlled and the thermal conductivity thereof may be enhanced.

According to one embodiment of the present disclosure, the adhesive resin composition contains a binder resin including one selected from the group consisting of a (meth)acrylate-based resin, an epoxy resin, and a combination thereof. As the adhesive resin composition contains the binder resin including the above-described one, it may increase the reliability of a semiconductor chip by virtue of improved curing properties thereof, may exhibit enhanced mechanical properties along with high heat resistance and adhesiveness, and may also exhibit excellent thermal conductivity characteristics.

According to one embodiment of the present disclosure, the (meth)acrylate-based resin may include a (meth)acrylate-based repeating unit including an epoxy-based functional group and a (meth)acrylate-based repeating unit (BzMA) including an aromatic functional group. As the (meth)acrylate-based resin includes the (meth)acrylate-based repeating unit (BzMA) including an aromatic functional group, the adhesive resin composition for a semiconductor may ensure a higher compatibility and bonding strength between the components contained therein, and may have high elasticity and a relatively enhanced initial tensile modulus. In addition, as the (meth)acrylate-based resin includes the (meth)acrylate-based repeating unit (BzMA) including an aromatic functional group, it may advantageously act on the dispersibility of the inorganic fillers, thereby providing a uniform distribution of the inorganic fillers and enhancing the filling property of the inorganic fillers.

In addition, as the (meth)acrylate-based resin includes the (meth)acrylate-based repeating unit including an epoxy-based functional group, an adhesive film for a semiconductor synthesized from the adhesive resin composition for a semiconductor may have a more uniform and solid internal structure, and thus may ensure high impact resistance during multilayer stacking of ultra-thin wafers, and it may also enhance electrical properties after semiconductor fabrication.

According to one embodiment of the present disclosure, the content of the (meth)acrylate-based repeating unit including an aromatic functional group in the (meth)acrylate-based resin may be 2 wt % to 40 wt %. Specifically, the content of the (meth)acrylate-based repeating unit including an aromatic functional group in the (meth)acrylate-based resin may be 3 wt % to 30 wt %, or 5 wt % to 25 wt %. If the content of the (meth)acrylate-based repeating unit including an aromatic functional group in the (meth)acrylate-based resin is excessively low, the effect of increasing the compatibility of the (meth)acrylate-based resin with the epoxy resin or curing agent and dispersibility of the fillers may be insignificant, and the effect of lowering the hygroscopicity of the finally produced adhesive film may also be insignificant. If the content of the (meth)acrylate-based repeating unit including an aromatic functional group in the (meth)acrylate-based resin is excessively high, the adhesiveness of the finally produced adhesive film for a semiconductor may be reduced.

According to one embodiment of the present disclosure, the aromatic functional group may be an aryl group having 6 to 20 carbon atoms, or an arylalkylene group including an aryl group having 6 to 20 carbon atoms and an alkylene group having 1 to 10 carbon atoms.

According to one embodiment of the present disclosure, the (meth)acrylate-based repeating unit including an epoxy-based functional group may include an epoxy cycloalkylmethyl (meth)acrylate repeating unit having 3 to 20 carbon atoms. The "epoxy cycloalkylmethyl having 3 to 20 carbon atoms" refers to a structure in which a cycloalkyl having 3 to 30 carbon atoms to which an epoxy group is attached is substituted with a methyl group. Examples of the epoxy cycloalkylmethyl (meth)acrylate having 3 to 20 carbon atoms include glycidyl (meth)acrylate or 3,4-epoxycyclohexylmethyl(meth)acrylate.

Meanwhile, according to one embodiment of the present disclosure, the (meth) acrylate-based resin may further include at least one repeating unit selected from the group consisting of a vinyl-based repeating unit including a reactive functional group and a (meth)acrylate-based functional group including an alkyl group having 1 to 10 carbon atoms.

According to one embodiment of the present disclosure, the reactive functional group may include at least one functional group selected from the group consisting of alcohol, amine, carboxylic acid, epoxide, imide, (meth)acrylate, nitrile, norbornene, olefin, polyethylene glycol, thiol and vinyl groups.

According to one embodiment of the present disclosure, when the (meth)acrylate-based resin further includes at least one repeating unit selected from the group consisting of a vinyl-based repeating unit including a reactive functional group and a (meth)acrylate-based functional group including an alkyl group having 1 to 10 carbon atoms, the (meth)acrylate-based resin may contain 0.1 wt % to 30 wt %, 5 wt % to 30 wt %, or 10 wt % to 30 wt % of the (meth)acrylate-based repeating unit including an epoxy-based functional group.

According to one embodiment of the present disclosure, the (meth)acrylate-based resin may have a glass transition temperature of −10° C. to 20° C., −5° C. to 15° C., or 5° C. to 15° C. In addition, the (meth)acrylate-based resin may have a weight average molecular weight of 30,000 g/mol to 1,500,000 g/mol, 50,000 g/mol to 800,000 g/mol, or 50,000 g/mol to 200,000 g/mol. As the (meth)acrylate-based resin having the above-described glass transition temperature and weight-average molecular weight is used, the finally produced adhesive film for a semiconductor may ensure high adhesiveness and may be easily produced in the form of a thin film or the like.

According to one embodiment of the present disclosure, if the molecular weight of the (meth)acrylate-based resin is excessively low, it may not be easy to form the adhesive film for a semiconductor, and thus the cutability of the adhesive film may deteriorate, and accordingly, chip pick-up performance in a package fabrication process may deteriorate. In addition, if the molecular weight of the (meth)acrylate-based resin is excessively high, the viscosity of the adhesive film for a semiconductor may increase and the high-temperature fluidity of the composition may be lowered. Thus, wafer wettability and embedding properties of the composition may be lowered, and hence voids may remain after package assembly and degrade the reliability of the package.

According to an exemplary embodiment of the present disclosure, the (meth)acrylate-based resin may have a hydroxyl equivalent of 0.15 eq/kg or less, 0.01 eq/kg to 0.15 eq/kg, 0.01 eq/kg to 0.10 eq/kg, or 0.01 eq/kg to 0.05 eq/kg.

According to one embodiment of the present disclosure, the epoxy resin may be at least one polymer resin selected from the group consisting of biphenyl-based epoxy resin, bisphenol A epoxy resin, bisphenol F epoxy resin, cresol novolac epoxy resin, phenol novolac epoxy resin, tetrafunctional epoxy resin, triphenolmethane-type epoxy resin, alkyl-modified triphenolmethane-type epoxy resin, naphthalene-type epoxy resin, dicyclopentadiene-type epoxy resin, and dicyclopentadiene-modified phenol-type epoxy resin. Where the epoxy resin is selected from among those described above, it is possible to enhance the adhesiveness of the adhesive resin composition for a semiconductor while controlling the degree of curing thereof.

According to one embodiment of the present disclosure, the softening point of the epoxy resin may be −50° C. to 100° C. If the softening point of the epoxy resin is excessively low, the adhesiveness of the adhesive resin composition for a semiconductor may increase, and thus chip pick-up performance after dicing may be reduced, and if the softening point of the epoxy resin is excessively high, the high-temperature fluidity of the adhesive resin composition for a semiconductor may be reduced, and the adhesiveness thereof may be reduced.

According to one embodiment of the present disclosure, the epoxy resin that is used in the present disclosure may be a combination of two or more epoxy resins having different softening points. Where the epoxy resin used is a combination of two or more epoxy resins having different softening points as described above, it may provide sufficient fluidity in a packaging assembly process.

According to one embodiment of the present disclosure, the epoxy equivalent of the epoxy resin may be 100 g/eq to 300 g/eq.

According to one embodiment of the present disclosure, the adhesive resin composition for a semiconductor contains a curing agent. Specifically, the adhesive resin composition for a semiconductor may contain a phenolic resin as the curing agent. As the adhesive resin composition for a semiconductor contains the curing agent as described above, it is possible to enhance the degree of curing of the composition.

According to one embodiment of the present disclosure, the phenolic resin may have a hydroxyl equivalent of 80 g/eq to 400 g/eq, 90 g/eq to 250 g/eq, 100 g/eq to 178 g/eq, or 210 g/eq to 240 g/eq. As the phenolic resin has a hydroxyl equivalent within the above-described range, it may impart excellent adhesiveness to the resin composition by increasing the degree of curing of the resin composition even when the content thereof is low.

According to one embodiment of the present disclosure, the curing agent may further include at least one compound selected from the group consisting of an amine-based curing agent and an acid anhydride-based curing agent. The amount of the curing agent used may be appropriately selected in consideration of the physical properties of the finally produced adhesive film. For example, the curing agent may be used in an amount of 10 parts by weight to 700 parts by weight, or 30 parts by weight to 300 parts by weight, based on 100 parts by weight of the epoxy resin.

According to one embodiment of the present disclosure, the adhesive resin composition for a semiconductor contains at least two inorganic fillers having different average particle diameters. Specifically, the adhesive resin composition for a semiconductor preferably contains two inorganic fillers having different average particle diameters as described above. As the adhesive resin composition for a semiconductor contains two inorganic fillers having different average particle diameters as described above as described above, it may rapidly transfer heat generated from an electric device or the like to a PCB ground or a heat sink.

According to one embodiment of the present disclosure, the content of the inorganic fillers may be 70 wt % to 95 wt %. Specifically, the content of the inorganic fillers may be 73 wt % to 93 wt %, 75 wt % to 90 wt %, or 78 wt % to 87 wt %. Where the content of the inorganic fillers is controlled within the above range, it is possible to enhance the thermal conductivity of the adhesive film for a semiconductor formed from the adhesive resin composition for a semiconductor, enhance the dispersibility of the inorganic fillers in the adhesive resin composition for a semiconductor, and maintain proper embedding properties.

According to one embodiment of the present disclosure, the content of the inorganic fillers may be 95 wt % or more. Where the content of the inorganic fillers is controlled as described above, the adhesive film for a semiconductor formed from the adhesive resin composition for a semiconductor may exhibit a thermal conductivity of 6.0 W/mK or more.

According to one embodiment of the present disclosure, the inorganic fillers may have a spherical shape. Where the selected shape of the inorganic fillers is a spherical shape as described above, it is possible to increase the filling rate of the inorganic fillers having different particle diameters and reduce the thickness of the adhesive film for a semiconductor.

According to one embodiment of the present disclosure, the inorganic fillers may be made of one selected from the group consisting of alumina ($Al_2O_3$), boron nitride (BN), aluminum nitride (AlN), silicon carbide (SiC), magnesium oxide (MgO), zinc oxide (ZnO), aluminum hydroxide (Al$(OH)_3$), and combinations thereof. Specifically, the inorganic fillers are preferably made of alumina. Where the material of the inorganic fillers is selected from among those described above, it is possible to enhance the dispersibility of the inorganic fillers in the adhesive resin composition for a semiconductor and enhance the thermal conductivity of the adhesive film for a semiconductor.

According to one embodiment of the present disclosure, the inorganic filler may include a first inorganic filler having an average particle diameter of 3 µm to 10 µm and a second inorganic filler having an average particle diameter of 0.1 µm to 1.0 µm. Specifically, the first inorganic filler may have an average particle diameter of 3.5 µm to 9.5 µm, 4.0 µm to 9.0 µm, 4.5 µm to 8.5 µm, 5.0 µm to 8.0 µm, 5.5 µm to 7.5 µm, or 6.0 µm to 7.0 µm. In addition, the second inorganic filler may have an average particle diameter of 0.1 µm to 1.0 µm, 0.2 µm to 0.9 µm, 0.3 µm to 0.8 µm, 0.4 µm to 0.7 µm, or 0.5 µm to 0.6 µm. Where the average particle diameter of each of the first inorganic filler and the second inorganic filler is controlled within the above-described range, the high-temperature fluidity of the fillers may be enhanced, and thinning of the adhesive film for a semiconductor is possible, and thus the heat dissipation effect of the adhesive film may be enhanced.

According to one embodiment of the present disclosure, the specific surface area of the first inorganic filler may be 2.0 $m^2/g$ to 4.0 $m^2/g$. Specifically, the specific surface area of the first inorganic filler may be 2.0 $m^2/g$ to 4.0 $m^2/g$, 2.2 $m^2/g$ to 3.8 $m^2/g$, 2.4 $m^2/g$ to 3.6 $m^2/g$, 2.6 $m^2/g$ to 3.4 $m^2/g$, or 2.8 $m^2/g$ to 3.2 $m^2/g$.

According to one embodiment of the present disclosure, the specific surface area of the second inorganic filler may be 7.5 $m^2/g$ to 14.0 $m^2/g$. Specifically, the specific surface area of the second inorganic filler may be 8.0 $m^2/g$ to 13.5 $m^2/g$, 8.5 $m^2/g$ to 13.0 $m^2/g$, 9.0 $m^2/g$ to 12.5 $m^2/g$, 9.5 $m^2/g$ to 12.0 $m^2/g$, or 10.0 $m^2/g$ to 11.5 $m^2/g$. Where the specific surface area of each of the first inorganic filler and the second inorganic filler is controlled within the above range, high-density filling of the inorganic filler is possible, and thinning of the adhesive film for a semiconductor is possible, so that the thermal conductivity of the adhesive film may be enhanced.

According to one embodiment of the present disclosure, the proportion of the content of the second inorganic filler relative to the total content of the inorganic fillers may be 1 wt % to 50 wt %. That is, the total weight of the second inorganic filler may be 1 wt % to 50 wt % based on the total weight of the inorganic fillers. Specifically, the proportion of the content of the second inorganic filler relative to the total content of the inorganic fillers may be 2 wt % to 49 wt %, 3 wt % to 48 wt %, 4 wt % to 47 wt %, 5 wt % to 46 wt %, 7 wt % to 45 wt %, 8 wt % to 44 wt %, 9 wt % to 43 wt %, 10 wt % to 42 wt %, 11 wt % to 41 wt %, 12 wt % to 40 wt %, 15 wt % to 35 wt %, or 20 wt % to 30 wt %. Where the proportion of the content of the second inorganic filler relative to the total content of the inorganic fillers is controlled within the above-described range, it is possible to increase the filling rate of the inorganic fillers, thereby increasing the content of the inorganic fillers in the adhesive film for a semiconductor and enhancing the thermal conductivity thereof.

According to one embodiment of the present disclosure, the adhesive resin composition for a semiconductor has a solid content of 80 wt % to 95 wt %. The solid content may mean the content (wt %) of solids in the composition. Where the solid content is controlled within the above range, the adhesive film for a semiconductor formed from the adhesive resin composition for a semiconductor may exhibit a thermal conductivity of 6.0 W/mK or more.

Another embodiment of the present disclosure provides an adhesive film for a semiconductor comprising a cured product obtained by curing the adhesive resin composition for a semiconductor according to one embodiment of the present disclosure.

The adhesive film for a semiconductor according to another embodiment of the present disclosure may have a small thickness, an increased thermal conductivity and enhanced storage stability as a result of controlling the average particle diameters of the inorganic fillers.

According to one embodiment of the present disclosure, the density of the cured product may be 2.0 $g/m^3$ to 3.5 $g/m^3$. Specifically, the density of the cured product is 2.1 $g/m^3$ to 3.4 $g/m^3$, 2.2 $g/m^3$ to 3.3 $g/m^3$, 2.3 $g/m^3$ to 3.2 $g/m^3$, 2.4 $g/m^3$ to 3.1 $g/m^3$, or 2.5 $g/m^3$ to 3.0 $g/m^3$. Where the density of the cured product is controlled within the above range, it is possible to secure the mechanical properties of the adhesive film for a semiconductor.

According to one embodiment of the present disclosure, the filling rate of the inorganic filler in the cured product may be 60 vol % to 80 vol %. Specifically, the filling rate of the inorganic filler in the cured product may be 62 vol % to 78 vol %, 64 vol % to 76 vol %, 66 vol % to 74 vol %, or 68 vol % to 72 vol %. Where the filling rate of the inorganic filler in the cured product is controlled within the above-described range, it is possible to reduce the thickness of the adhesive film for a semiconductor, thereby enhancing the thermal conductivity of the adhesive film.

According to one embodiment of the present disclosure, the thermal conductivity of the adhesive film for a semiconductor may be 3.0 W/mK to 6.0 W/mK. Specifically, the thermal conductivity of the adhesive film for a semiconductor may be 3.5 W/mK to 5.7 W/mK, 3.7 W/mK to 5.6 W/mK, 3.8 W/mK to 5.5 W/mK, 3.9 W/mK to 5.4 W/mK, 4.0 W/mK to 5.3 W/mK, 4.1 W/mK to 5.2 W/mK, 4.2 W/mK to 5.1 W/mK, or 4.3 W/mK to 5.0 W/mK. Where the thermal conductivity of the adhesive film for a semiconductor is controlled within the above-described range, it is possible to enhance the storage stability of the adhesive film for a semiconductor. Specifically, it is possible to enhance the thermal conductivity and storage stability of the adhesive film for a semiconductor by treating the surfaces of the inorganic fillers.

According to one embodiment of the present disclosure, the thickness of the adhesive film for a semiconductor may be 10 µm to 30 µm. Specifically, the thickness of the adhesive film for a semiconductor may be 11 µm to 29 µm, 12 µm to 28 µm, 13 µm to 27 µm, 14 µm to 26 µm, 15 µm to 25 µm, or 16 µm to 24 µm. Where the thickness of the adhesive film for a semiconductor is controlled within the above-described range, it is possible to minimize a phenomenon in which the adhesive film for a semiconductor does not adhere to a semiconductor chip when warpage of the adhesive film occurs, and it is possible to prevent the film from being excessively pressed out by the load of die attachment and contaminating a pad.

According to one embodiment of the present disclosure, when the adhesive film for a semiconductor is applied to a multilayer package structure of a semiconductor chip, it is possible to realize a stable structure and excellent mechanical properties such as heat resistance and impact resistance, and prevent the occurrence of reflow cracks or the like. In particular, in this case, voids may not substantially occur even when the package structure is exposed for a long time to high temperature conditions that are applied in a semiconductor fabrication process.

In addition, the adhesive film for a semiconductor has a high breaking strength and a low elongation at break, and thus is applicable not only to a method of cutting a wafer using a blade, but also to other non-contact adhesive cutting methods, for example, dicing-before-grinding (DBG). In addition, the adhesive film for a semiconductor has an excellent property of being divided into parts even at low temperatures, and thus has a low possibility of re-adhesion even when being left at room temperature, thereby increasing the reliability and efficiency of a semiconductor fabrication process.

The adhesive film may be used as a die attach film (DAF) for bonding a lead frame or a substrate to a die or bonding between dies. Accordingly, the adhesive film may be processed in the form of a die bonding film or a dicing die-bonding film.

The adhesive film for a semiconductor may be obtained through a method of applying and drying the adhesive resin composition for a semiconductor according to the above-described embodiment. The method of applying and drying the adhesive resin composition is not particularly limited, and various methods well known in the common film production process may be applied without limitation.

Still another embodiment of the present disclosure may provide a dicing die-bonding film including: a substrate film; a first adhesive layer formed on the substrate film; and a second adhesive layer formed on the first adhesive layer and including the adhesive film for a semiconductor according to the above-described other embodiment.

Specific details regarding the adhesive film for a semiconductor are as described above in the above-described other embodiment.

Meanwhile, the type of substrate film included in the dicing die-bonding film is not particularly limited. For example, a plastic film or metal foil known in the art may be used as the substrate film. For example, the substrate film may include low-density polyethylene, linear polyethylene, medium-density polyethylene, high-density polyethylene, ultra-low-density polyethylene, a random copolymer of polypropylene, a block copolymer of polypropylene, homopolypropylene, polymethylpentene, an ethylene-vinyl acetate copolymer, an ethylene-methacrylic acid copolymer, an ethylene-methyl methacrylate copolymer, an ethylene-ionomer copolymer, an ethylene-vinyl alcohol copolymer, polybutene, a styrene copolymer, or a mixture of two or more thereof. Here, the substrate film including the mixture of two or more polymers is meant to include a film having a structure in which two or more films including the above-described polymers, respectively, are laminated to each other, or a monolayered film including two or more of the above-mentioned polymers.

The thickness of the substrate film is not particularly limited, and is generally 10 µm to 200 µm, preferably 50 µm to 180 µm. If the thickness is less than 10 µm, a problem may arise in that the control of the cut depth in the dicing process is unstable, and if the thickness is more than 200 µm, a problem may arise in that a large amount of burrs occur in the dicing process, or the expanding process is not performed accurately due to the reduced elongation of the film.

The substrate film may be subjected to conventional physical or chemical treatment such as matting treatment, corona discharge treatment, primer treatment or crosslinking treatment, if necessary.

Meanwhile, the first adhesive layer may include a UV-curable adhesive or a heat-curable adhesive. When the UV-curable adhesive is used, the adhesiveness thereof is reduced by irradiating the substrate film side with UV light to increase the cohesiveness and glass transition temperature of the adhesive. When the heat-curable adhesive is used, the adhesiveness thereof is reduced by applying heat.

In addition, the UV-curable adhesive may include a (meth)acrylate-based resin, a UV-curable compound, a photoinitiator, and a crosslinking agent.

Here, the (meth)acrylate-based resin may have a weight-average molecular weight of 100,000 g/mol to 1,500,000 g/mol, preferably 200,000 g/mol to 1,000,000 g/mol. If the weight-average molecular weight is less than 100,000 g/mol, a problem may arise in that the coatability or cohesiveness of the UV-curable adhesive is lowered, and thus a residue remains on the adherend after peeling, or the adhesive breakage phenomenon occurs. Meanwhile, if the weight-average molecular weight is more than 1,500,000 g/mol, a problem may arise in that the base resin interferes with the reaction of the UV-curable compound, and thus the peel force is not effectively reduced.

The (meth)acrylate-based resin may be, for example, a copolymer of a (meth)acrylic acid ester-based monomer and a monomer containing a crosslinkable functional group. In this case, examples of the (meth)acrylic acid ester-based monomer include alkyl (meth)acrylates, and more specifically, include monomers each having an alkyl group having 1 to 12 carbon atoms. More specifically, the (meth)acrylate-based monomer may be one or a mixture of two or more selected from among pentyl (meth)acrylate, n-butyl (meth)acrylate, ethyl (meth)acrylate, methyl (meth)acrylate, hexyl (meth)acrylate, n-octyl (meth)acrylate, isooctyl (meth)acrylate, 2-ethyl hexyl (meth)acrylate, dodecyl (meth)acrylate, and decyl (meth)acrylate. As a monomer containing an alkyl group having a larger number of carbon atoms is used, the glass transition temperature of the final copolymer becomes lower. Thus, an appropriate monomer may be selected depending on the desired glass transition temperature.

In addition, examples of the monomer containing a crosslinkable functional group include one or a mixture of two or more selected from among a monomer containing a hydroxyl group, a monomer containing a carboxyl group, and a nitrogen-containing monomer. Here, examples of the hydroxyl group-containing compound include, but are not limited to, 2-hydroxyethyl (meth)acrylate, and 2-hydroxypropyl (meth)acrylate, and examples of the carboxyl group-containing compound include, but are not limited to, (meth)acrylic acid, and examples of the nitrogen-containing monomer include, but are not limited to, (meth)acrylonitrile, N-vinyl pyrrolidone, and N-vinyl caprolactam.

The (meth)acrylate-based resin may further include a carbon-carbon double bond-containing low-molecular-weight compound, such as vinyl acetate, styrene, or acrylonitrile, from the viewpoint of improving other functionalities such as compatibility.

In addition, the type of UV-curable compound is not particularly limited, and for example, a polyfunctional compound (e.g., polyfunctional urethane acrylate, a polyfunctional acrylate monomer or oligomer, etc.) having a weight average molecular weight of 100 g/mol to 300,000 g/mol, or 500 g/mol to 100,000 g/mol may be used as the UV-curable compound. A person of ordinary skill in the art can readily select an appropriate compound according to the intended use.

The content of the UV-curable compound may be 5 parts by weight to 400 parts by weight, preferably 10 parts by weight to 200 parts by weight, based on 100 parts by weight of the above-described base resin. If the content of the UV-curable compound is less than 5 parts by weight, a problem may arise in that pickup performance may deteriorate due to an insufficient decrease in adhesiveness after curing, and if the content of the UV-curable compound is more than 400 parts by weight, a problem may arise in that the cohesiveness of the adhesive before UV irradiation is insufficient, or peeling from a release film, etc. is not easily achieved.

The type of photoinitiator is also not particularly limited, and a common photoinitiator known in the art may be used. The content of the photoinitiator may be 0.05 parts by weight to 20 parts by weight based on 100 parts by weight of the UV-curable compound. If the content of the photoinitiator is less than 0.05 parts by weight, a problem may arise in that the curing reaction by UV irradiation is insufficient, resulting in deterioration in pick-up performance, and if the content of the photoinitiator is more than 20 parts by weight, the crosslinking reaction during the curing process occurs in short units, or a unreacted UV-curable compound remains and causes residue on the surface of the adherend, or the peeling force after curing is excessively reduced, resulting in deterioration in pick-up performance.

In addition, the type of crosslinking agent included in the first adhesive layer to impart adhesiveness and cohesiveness is also not particularly limited, and a conventional compound may be used as the crosslinking agent, such as an isocyanate-based compound, an aziridine-based compound, an epoxy-based compound or a metal chelate-based compound. The crosslinking agent may be contained in an amount of 2 parts by weight to 40 parts by weight, preferably 2 parts by weight to 20 parts by weight, based on 100 parts by weight of the base resin. If the content of the crosslinking agent is less than 2 parts by weight, a problem may arise in that the cohesiveness of the adhesive is insufficient, and if the content is more than 20 parts by weight, a problem may arise in that the adhesiveness of the adhesive before UV irradiation is insufficient, and thus chip scattering occurs.

The first adhesive layer may further include a tackifier such as a rosin resin, a terpene resin, a phenolic resin, a styrene resin, an aliphatic petroleum resin, an aromatic petroleum resin, or an aliphatic/aromatic copolymer petroleum resin.

A method of forming the first adhesive layer including the above-described components on the substrate film is not particularly limited. For example, the method of forming the first adhesive layer may be a method of forming the first adhesive layer by applying the adhesive composition of the present disclosure directly onto the substrate film, or a method of applying the adhesive composition onto a peelable substrate to form an adhesive layer, and then transferring the first adhesive layer from the peelable substrate onto the substrate film.

At this time, the method of applying and drying the adhesive composition is not particularly limited, and for example, the method may be a method of directly applying the composition containing the above-described components, or a method of diluting the composition in a suitable organic solvent, applying the dilution by a known means such as a comma coater, a gravure coater, a die coater, or a reverse coater, and then removing the solvent by drying at a temperature of 60° C. to 200° C. for 10 seconds to 30 minutes. In addition, in the above process, an aging process may be additionally performed for a sufficient crosslinking reaction of the adhesive.

The thickness of the first adhesive layer is not particularly limited, but may be, for example, in the range of 10 μm to 500 μm.

Meanwhile, as described above, the second adhesive layer may be formed on the first adhesive layer and may include the adhesive film for a semiconductor according to the above-described embodiment. Details regarding the adhesive film for a semiconductor include all of the details described above in the other embodiments.

The dicing die-bonding film may further include a release film formed on the second adhesive layer. Examples of the release film that may be used include one or more plastic films selected from among a polyethylene terephthalate film, a polytetrafluoroethylene film, a polyethylene film, a polypropylene film, a polybutene film, a polybutadiene film, a vinyl chloride copolymer film, and a polyimide film.

The surface of the release film described above may be release-treated with one or more of alkyd-based, silicone-based, fluorine-based, unsaturated ester-based, polyolefin-based, and wax-based release agents. Among these release agents, the heat-resistant alkyd-based, silicone-based or fluorine-based release agent is particularly preferable.

The release film may be formed to have a thickness of, generally about 10 μm to 500 μm, preferably 20 μm to 200 μm, but is not limited thereto.

A method for producing the above-described dicing die-bonding film is not particularly limited, and may be, for example, a method of sequentially forming the first adhesive layer, the second adhesive layer and the release film on the substrate film, or a method of separately preparing a dicing film (substrate film+first adhesive layer) and a release film having a die-bonding film or the second adhesive layer formed thereon, and then laminating these films to each other.

Here, the lamination method is not particularly limited, and may be a hot roll lamination method or a lamination press method. Among these methods, the hot roll lamination method is preferable in terms of continuous processability and efficiency. The hot roll lamination method may be performed at a temperature of 10° C. to 100° C. and a pressure of 0.1 Kgf/cm$^2$ to 10 Kgf/cm$^2$, but is not limited thereto.

In the dicing die-bonding film, the adhesive force between the substrate film and the second adhesive layer including the adhesive film for a semiconductor according to the above-described other embodiment may be 180 gf/25 mm$^2$ or less, or 100 gf/25 mm$^2$ to 180 gf/25 mm$^2$, or 100 gf/25 mm$^2$ to 150 gf/25 mm$^2$, or 120 gf/25 mm$^2$ to 140 gf/25 mm$^2$, or 125 gf/25 mm$^2$ to 135 gf/25 mm$^2$, or 129 gf/25 mm$^2$ to 132 gf/25 mm$^2$. Here, the adhesive force may be obtained by storing the dicing die-bonding film in an oven at a temperature of 40° C. for 48 hours, and then measuring the peeling force between the substrate film and the adhesive film according to Item 8 of Korean Industrial Standards KS-A-01107 (test methods for adhesive tapes and adhesive sheets).

In the dicing die-bonding film, if the adhesive force between the substrate film and the second adhesive layer including the adhesive film for a semiconductor according to the above-described other embodiment excessively increases to more than 180 gf/25 mm$^2$, storage stability of the dicing die-bonding film may decrease due to the adhesion reaction between the films at room temperature, and the relatively high adhesiveness of the dicing die-bonding film may be maintained even after UV irradiation, and thus the pick-up performance after dicing may deteriorate.

Meanwhile, after dicing die-bonding film is irradiated with UV light, the adhesive force between the substrate film and the second adhesive layer including the adhesive film for a semiconductor according to the above-described other embodiment may be 30 gf/25 mm² or less, or 1 gf/25 mm² to 30 gf/25 mm², or 1 gf/25 mm² to 20 gf/25 mm², or 5 gf/25 mm² to 15 gf/25 mm², or 10 gf/25 mm² to 15 gf/25 mm², or 10 gf/25 mm² to 13 gf/25 mm². The adhesive force after UV irradiation may be obtained by irradiating the dicing doe-bonding film with light at a dose of 400 mJ/cm² for 5 seconds from a high-pressure mercury lamp having an illuminance of 70 mW/cm², and then measuring the peeling force between the substrate film and the adhesive film according to Item 8 of Korean Industrial Standards KS-A-01107 (test methods for adhesive tapes and adhesive sheets).

In the dicing die-bonding film after UV irradiation, if the adhesive force between the substrate film and the second adhesive layer including the adhesive film for a semiconductor according to the above-described other embodiment excessively increases to more than 30 gf/25 mm², the pick-up performance after dicing may deteriorate.

Still another embodiment of the present disclosure may provide a method for dicing a semiconductor wafer, the method including: a pre-processing step of partially processing a semiconductor wafer including the dicing die-bonding film of the other embodiment and a wafer stacked on at least one surface of the dicing die-bonding film, so that the semiconductor wafer is divided completely or dividable into individual chips; and a step of irradiating the substrate film of the pre-processed semiconductor wafer with UV light, and picking up the individual chips separated by the division of the semiconductor wafer.

Details on the dicing die-bonding film include all of the details described above in the other embodiments.

Except for details on each step of the above-described dicing method, commonly known devices and methods, etc. used for dicing of a semiconductor wafer may be used without any particular limitation.

The method for dicing the semiconductor wafer may further include a step of expanding the semiconductor wafer, after the pre-processing step. In this case, the expanding step is followed by the process of irradiating the substrate film of the expanded semiconductor wafer with UV light and picking up the individual chips separated by the division of the semiconductor wafer.

As the dicing die-bonding film including the dicing film is used, it is possible to minimize the burr phenomenon that may occur during the process of dicing the semiconductor wafer, thereby preventing contamination of the semiconductor chip, and it is possible to enhance the reliability and lifespan of the semiconductor chip.

Hereinafter, the present disclosure will be described in detail with reference to examples. However, the examples according to the present disclosure may be modified into various different forms, and the scope of the present disclosure is not interpreted as being limited to the examples described below. The examples of the present specification are provided to more completely explain the present disclosure to those skilled in the art.

Production Example 1 (Thermoplastic Resin)

70 g of butyl acrylate, 15 g of acrylonitrile, 5 g of glycidyl methacrylate and 10 g of benzyl methacrylate were mixed together in 100 g of toluene and allowed to react at 80° C. for about 12 hours, thereby synthesizing an acrylate resin (weight-average molecular weight: about 400,000 g/mol, and glass transition temperature: 10° C.) to which a glycidyl group has been introduced as a branched chain.

Examples and Comparative Examples: Production of Adhesive Resin Compositions for Semiconductor and Adhesive Films for Semiconductor Example 1

The following components were milled in a methyl ethyl ketone solvent using a milling machine: 4 g of phenolic resin KA-1160 (DIC Corp., cresol novolac resin, hydroxyl equivalent: 190 g/eq, softening point: 65° C.) as an epoxy resin curing agent; 2 g of epoxy resin EOCN-103S (Nippon Kayaku Co., Ltd., cresol novolac-type epoxy resin, epoxy equivalent: 214 g/eq, softening point: 80° C.); 5 g of liquid epoxy resin RE-310S (Nippon Kayaku Co., Ltd., bisphenol A epoxy resin, epoxy equivalent: 180 g/eq); about 11.7 g of spherical alumina (having an average particle diameter of 5 μm and a specific surface area of 2.0 m²/g) as a first inorganic filler; and 2 g of spherical alumina (having an average particle diameter of 0.5 μm and a specific surface area of 10.0 m²/g) as a second inorganic filler.

Then, 4 g of the thermoplastic acrylate resin (Mw: 520,000, glass transition temperature: 10° C.) of the Production Example, 0.1 g of silane coupling agent A-187 (GE Toshiba Silicone, gamma-glycidoxypropyltrimethoxysilane), 0.1 g of 1-cyanoethyl-2-ethyl-4-methylimidazole (2E4MZ-CN) as a curing accelerator, and 0.1 g of trimesic acid (TMA) were added to the mixture and milled for additional 2 hours to obtain an adhesive resin composition solution for a semiconductor (solid content: 82.5 wt %). This adhesive resin composition solution was applied using an automatic coating machine to obtain an adhesive film for a semiconductor having a film thickness of 20 μm.

Example 2

An adhesive film for a semiconductor was produced in the same manner as in Example 1, except that about 12.5 g of spherical alumina (having an average particle diameter of 5 μm and a specific surface area of 2.0 m²/g) as the first inorganic filler and 2.5 g of spherical alumina (having an average particle diameter of 0.5 μm and a specific surface area of 10.0 m²/g) as the second inorganic filler were added and an adhesive resin composition solution for a semiconductor (solid content: 87.5 wt %) was obtained.

Example 3

An adhesive film for a semiconductor was produced in the same manner as in Example 1, except that about 13.0 g of spherical alumina (having an average particle diameter of 5 μm and a specific surface area of 2.0 m²/g) as the first inorganic filler and 2.7 g of spherical alumina (having an average particle diameter of 0.5 μm and a specific surface area of 10.0 m²/g) as the second inorganic filler were added and an adhesive resin composition solution for a semiconductor (solid content: 87.5 wt %) was obtained.

Comparative Example 1

An adhesive film for a semiconductor was produced in the same manner as in Example 1, except that only about 13.7 g of the first inorganic filler was added without adding the second inorganic filler.

Comparative Example 2

An adhesive film for a semiconductor was produced in the same manner as in Example 1, except that only about 13.7 g of the second inorganic filler was added without adding the first inorganic filler.

Comparative Example 3

An adhesive film for a semiconductor was produced in the same manner as in Example 1, except that the content of the second inorganic filler was about 0.55 g.

Comparative Example 4

An adhesive film for a semiconductor was produced in the same manner as in Example 1, except that spherical alumina having an average particle diameter of 10 μm and a specific surface area of less than 2.0 m²/g was added as the first inorganic filler.

Comparative Example 5

An adhesive film for a semiconductor was produced in the same manner as in Example 1, except that spherical alumina having an average particle diameter of 1 μm to 2 μm and a specific surface area of more than 4.0 m²/g was added as the first inorganic filler.

Comparative Example 6

An adhesive film for a semiconductor was produced in the same manner as in Example 1, except that spherical alumina having an average particle diameter of 1 μm to 2 μm and a specific surface area of less than 7.5 m²/g was added as the second inorganic filler.

Comparative Example 7

An adhesive film for a semiconductor was produced in the same manner as in Example 1, except that spherical alumina having an average particle diameter of about 100 nm and a specific surface area of more than 14.0 m²/g was added as the second inorganic filler.

Experimental Example 1 (Measurement of Thickness of Adhesive Film for Semiconductor)

Each of the films obtained by coating in the Examples and the Comparative Examples was passed through a SUS ROLL thermal lamination machine at 70° C. to flatten the surface thereof. Then, the thickness of each adhesive film for a semiconductor was measured using a measuring device (Mitutoyo, Litematic VL-50).

Experimental Example 2 (Measurement of Thermal Conductivity of Adhesive Film for Semiconductor)

Each of the films obtained by coating in the Examples and the Comparative Examples was passed through a SUS ROLL thermal lamination machine at 70° C. to flatten the surface thereof. Each of the flattened adhesive films for a semiconductor was laminated using a rubber roll laminator until it became 600 μm thick. The films thus obtained were cured to finally obtain cured films. Then, a specimen having a size of 10 mm*10 mm prepared from each cured film, and the thermal conductivity thereof was measured using a Laser flash type thermal conductivity device LFA467.

The values measured in Experimental Examples 1 and 2 above are summarized in Table 1 below.

TABLE 1

| | Thickness (μm) of adhesive film for semiconductor (μm) | Thermal conductivity (W/mK) of adhesive film for semiconductor |
|---|---|---|
| Example 1 (solid content: 82.5 wt %) | 20 | 2.0 |
| Example 2 (solid content: 87.5 wt %) | 20 | 3.0 |
| Example 3 (solid content: 92.5 wt %) | 20 | 5.0 |
| Comparative Example 1 (solid content: 82.5 wt %) | 20 | 1.8 |
| Comparative Example 2 (solid content: 82.5 wt %) | 20 | 1.5 |
| Comparative Example 3 (solid content: 75 wt %) | 20 | 1.8 |

Referring to Table 1, it was confirmed that, in the case of Examples 1 to 3, as a result of including the first and second inorganic fillers each having the predetermined average particle diameter, the adhesive film for a semiconductor could have a thin thickness of 15 μm to 20 μm, and the thermal conductivity thereof was 2.0 W/mK to 5.0 W/mK. Specifically, it was confirmed that, in Examples 1 to 3, the thermal conductivity of the adhesive film could be enhanced by controlling the sizes and contents of the inorganic fillers.

In contrast, it could be confirmed that, in the case of Comparative Examples 1 to 3 in which both the first and second inorganic fillers each having the predetermined average particle diameter were not included or the contents of the first and second inorganic fillers were not satisfied, it was impossible to reduce the thickness of the adhesive film for a semiconductor or the thermal conductivity of the adhesive film decreased.

Experimental Example 3 (Measurement of Film Coatability)

The viscosity before coating of the adhesive resin composition solution for a semiconductor produced in each of Examples 1 to 3 and Comparative Examples 4 to 7 was measured using a "Brookfield DV3T" model (Cone and Plate type). Specifically, 2 ml of the adhesive resin composition solution for a semiconductor was placed in a measurement container, and then covered with a cover with CPA-41 Cone, and then the viscosity value thereof was measured while the shear rate was increased. The case satisfying a viscosity of 500 cps to 10,000 cps at room temperature (25° C.) and 5 rpm was rated as O, and the case not satisfying the above viscosity was rated as X.

Experimental Example 4 (Measurement of Wafer Wettability)

The adhesive film obtained in each of Examples 1 to 3 and Comparative Examples 4 to 7 was cut in a circular shape having a diameter of 22 cm. Each of the circular films thus prepared was laminated onto a PO film coated with an adhesive layer, thus preparing dicing die-bonding films.

Separately, an 80-μm wafer was laminated on a dicing film and cut to a size of 8 mm*8 mm. Then, the divided wafer and each adhesive film were thermally laminated to each other using a mounting device at 70° C., and whether the adhesive film would not adhere was checked.

Experimental Example 5 (Measurement of Pick-Up Performance)

The adhesive film obtained in each of Examples 1 to 3 and Comparative Examples 4 to 7 was cut in a circular shape having a diameter of 22 cm. Each of the circular films thus prepared was laminated onto a PO film coated with an adhesive layer, thus preparing dicing die-bonding films.

Separately, an 80-μm wafer (8 inches) was mounted at a temperature of 70° C. and then diced to a chip size of 13.3 mm×9.1 mm under the conditions described below.

Next, the substrate side of the dicing film of the diced sample was irradiated with UV light at a dose of 150 mJ/cm$^2$ (illuminance: 70 mW/cm$^2$), and then the dicing tape was peeled off and laminated again. Thereafter, expanding was performed a low-temperature chamber and a heat shrink system, thus preparing samples for measurement of pick-up performance.

The prepared samples were subjected to pick-up performance evaluation using SPA-400 (SHINKAWA) according to the following criteria, and the results of the evaluation are shown in Table 2 below.

Specifically, for evaluation of the pick-up performance, the needle pin height at which all individual chips were picked up was measured. The case in which all the individual chips were picked up (peeling of the die from the wafer) at a needle pin height of 0.5 mm or less was rated as O, and the case not satisfying the above condition was rated as X.

—Dicing Conditions—
Apparatus: DFD-6361 (DISCO)
Blade type: 27HEBB (DISCO)
Cut depth: 80 μm
Dicing speed: 15 mm/s
Number of blade rotations: 45,000 rpm
—Pickup Conditions—
Apparatus: SPA-400 (SHINKAWA)
Expanding height: 5 mm
Number of needles: 10
Needle plunge up height: 0.5 mm
Needle plunge up speed: 10 mm/s The values measured in Experimental Examples 3 to 5 above are summarized in Table 2 below.

TABLE 2

|  | Film coatability | Wafer wettability | Pick-up performance |
|---|---|---|---|
| Example 1 | O | O | O |
| Example 2 | O | O | O |
| Example 3 | O | O | O |
| Comparative Example 4 | O | X | X |
| Comparative Example 5 | O | X | X |
| Comparative Example 6 | O | X | X |
| Comparative Example 7 | X | — | — |

Referring to Table 2 above, it was confirmed that Examples 1 to 3 satisfied all of the film coatability, wafer wettability and pick-up performance as a result of including the first and second inorganic fillers each having an average particle diameter within a suitable range.

In contrast, it was confirmed that, in the case of Comparative Example 4 in which the adhesive film for a semiconductor having a thickness of 20 μm was produced, the increased average particle diameter of the first inorganic filler led to an increase in the surface roughness of the film, which resulted in a decrease in the wafer wettability and deterioration in the pick-up performance.

In addition, it was confirmed that, in the case of the adhesive film for a semiconductor produced in Comparative Example 5, the decreased average particle diameter of the first inorganic filler led to an increase in the number of the inorganic filler particles in the film, which made dispersion of the fillers difficult, and the filling rate (which is a rate at which the second inorganic filler is filled between the first inorganic filler particles) decreased, so that the fillers were exposed to the film surface, resulting in an increase in the surface roughness of the film, a decrease in the wafer wettability, and deterioration in the pick-up performance.

Furthermore, it was confirmed that, in the case of Comparative Example 6, the increased average particle diameter of the second inorganic filler led to a decrease in the filling rate (which is a rate at which the second inorganic filler is filled between the first inorganic filler particles), and the non-filled second inorganic filler particles increased the surface roughness of the film, and for this reason, the wafer wettability decreased and the pick-up performance deteriorated.

In addition, it was confirmed that, in the case of Comparative Example 7, the decreased average particle diameter of the second inorganic filler led to increased cohesiveness, and thus dispersion of the coating solution was reduced, so that the viscosity of the coating solution increased and the fluidity thereof decreased, and accordingly, no coating layer could be formed in the process of coating the film.

Therefore, since the adhesive resin composition for a semiconductor according to the present disclosure contains suitable amounts of the first and second inorganic fillers each having the specified average particle diameter, the adhesive film for a semiconductor according to the present disclosure may have a small thickness and exhibit thermal conductivity within an appropriate range.

As described above, the adhesive resin composition for a semiconductor according to one embodiment of the present disclosure does not cause separation between the inorganic fillers due to increased stability of the composition, and may contain a large amount of the inorganic fillers, and thus the density of a cured product of the composition may be controlled and the thermal conductivity thereof may be enhanced.

The adhesive film for a semiconductor according to another embodiment of the present disclosure may have a reduced thickness as a result of controlling the average particle diameters of the inorganic fillers, and may have enhanced storage stability due to increased thermal conductivity thereof.

Although the present disclosure has been described above by way of limited embodiments, the present disclosure is not limited thereto. It should be understood that the present disclosure can be variously changed and modified by those skilled in the art without departing from the technical sprit of the present disclosure and the range of equivalents to the appended claims.

What is claimed is:
1. An adhesive resin composition for a semiconductor containing:
    a binder resin comprising at least one resin selected from the group consisting of a (meth)acrylate-based resin and an epoxy resin;
    a curing agent; and at least two inorganic fillers having different average particle diameters, wherein the inorganic fillers comprise a first inorganic filler having an average particle diameter of 3 μm or more and less than 10 μm, and a second inorganic filler having an average particle diameter of greater than 0.1 μm and less than 1.0 μm, wherein the first inorganic filler has a specific surface area of 2.0 m$^2$/g to 4.0 m$^2$/g, and wherein the second inorganic filler has a specific surface area of 7.5 m$^2$/g to 14.0 m$^2$/g.

2. The adhesive resin composition of claim 1, wherein the inorganic fillers are contained in an amount of 70 wt % to 95 wt %.

3. The adhesive resin composition of claim 1, wherein the inorganic fillers have a spherical shape.

4. The adhesive resin composition of claim 1, wherein the inorganic fillers are made of at least one material selected from the group consisting of alumina (Al$_2$O$_3$), boron nitride (BN), aluminum nitride (AlN), silicon carbide (SiC), magnesium oxide (MgO), zinc oxide (ZnO), and aluminum hydroxide (Al(OH)$_3$).

5. The adhesive resin composition of claim 1, wherein the inorganic fillers comprise a first inorganic filler having an average particle diameter of 3.5 μm to 9.5 μm, and a second inorganic filler having an average particle diameter of 0.2 μm to 0.9 μm.

6. The adhesive resin composition of claim 1, wherein the second inorganic filler is contained in an amount of 1 wt % to 50 wt % based on the total weight of the inorganic fillers.

7. The adhesive resin composition of claim 1, having a solid content of 80 wt % to 95 wt %.

8. An adhesive film for a semiconductor comprising a cured product of the adhesive resin composition for a semiconductor according to claim 1.

9. The adhesive film of claim 8, wherein the cured product has a density of 2.0 g/m$^3$ to 3.5 g/m$^3$.

10. The adhesive film of claim 8, wherein a filling rate of the inorganic fillers in the cured product is 60 vol % to 80 vol %.

11. The adhesive film of claim 8, which has a thermal conductivity of 3.0 W/mK to 6.0 W/mK.

12. The adhesive film of claim 8, which has a thickness of 10 μm to 30 μm.

* * * * *